United States Patent [19]

Broad

[11] 4,146,485

[45] Mar. 27, 1979

[54] TUBE PRESSURE FILTERS

[75] Inventor: Bernard H. Broad, St. Austell, England

[73] Assignee: English Clays Lovering Pochin & Company Limited, St. Austell, England

[21] Appl. No.: 874,847

[22] Filed: Feb. 3, 1978

[30] Foreign Application Priority Data

Feb. 7, 1977 [GB] United Kingdom ............... 5011/77

[51] Int. Cl.² ............................................. B01D 29/10
[52] U.S. Cl. .................................. 210/416 R; 210/457
[58] Field of Search .................... 210/348, 354, 416 R, 210/437, 455, 457, 497 R

[56] References Cited

U.S. PATENT DOCUMENTS

| | | | |
|---|---|---|---|
| 2,312,999 | 3/1943 | DeLangen | 210/416 R X |
| 2,724,508 | 11/1955 | Luther | 210/416 R X |
| 3,421,628 | 1/1969 | Barnabe et al. | 210/416 M X |

FOREIGN PATENT DOCUMENTS

| | | | |
|---|---|---|---|
| 225720 | 2/1963 | Austria | 210/416 |
| 47-9037 | 3/1972 | Japan | 210/437 |

Primary Examiner—William A. Cuchlinski, Jr.
Attorney, Agent, or Firm—Weingram & Klauber

[57] ABSTRACT

A tube pressure filter comprising inner and outer compartments separated by an impermeable elastic sleeve includes an inlet to the inner compartment which is located in an upper end section of the tube pressure filter and includes a feed distribution system which comprises a substantially annular aperture extending around said upper end section debouching into the inner compartment of said tube pressure filter, said substantially annular aperture being (a) constructed and disposed so that, in use, feed material debouching therefrom has a downward component of velocity and (b) in communication with an antechamber formed in said upper end section into which antechamber a mixture to be pressure filtered can be introduced under pressure through a feed conduit.

7 Claims, 5 Drawing Figures

TUBE PRESSURE FILTERS

BACKGROUND OF THE INVENTION

This invention relates to apparatus for the separation of liquids and particulate solids.

Many kinds of pressure filter have been described. One kind of pressure filter which has been found to be especially useful for separating liquids and very fine particulate solids is a tube pressure filter which comprises a pair of coaxial, generally tubular inner and outer assemblies arranged one within the other and adapted to be supported in a generally upright position, an impermeable elastic sleeve disposed within and secured to the outer tubular assembly, a filter element disposed around and supported by the inner tubular assembly, outlet means for the discharge from the interior of the inner tubular assembly of filtrate (i.e. liquid) which has passed through the filter element and through apertures in the inner tubular assembly, and means for displacing the tubular assemblies axially relative to one another between first and second positions, the arrangement being such that in the first position of said tubular assemblies they co-operate with each other to define a closed chamber of annular cross-section which is divided into coaxial and non-intercommunicating inner and outer compartments by said impermeable elastic sleeve, the inner compartment having an inlet for feed material comprising a mixture of a liquid and a particulate solid to be separated and the outer compartment having an inlet for a hydraulic fluid under pressure, and in the second position of said tubular assemblies said chamber of annular cross-section is open to enable the particulate solid to be discharged from the inner compartment. Hereinafter such a tube pressure filter will be referred to as a "tube pressure filter of the kind set forth". Tube pressure filters of the kind set forth have been described, for example, in British patent specification Nos. 907,485 and 1,240,465.

In a tube pressure filter of the kind set forth the inner tubular assembly and the filter element disposed around and supported thereby are constructed and arranged so that, in use, when the tubular assemblies are in their first position, liquid from the mixture of the liquid and particulate solid can be forced through the filter element and through apertures in the inner tubular assembly while the particulate solid from said mixture is retained on the filter element, the liquid being forced through the filter element by the introduction of a hydraulic fluid under pressure into the outer compartment (the hydraulic fluid urging the impermeable elastic sleeve towards the filter element so as to compress the mixture in the inner compartment and express liquid therefrom); and so that, in use, when the tubular assemblies are in their second position and the chamber of annular cross-section is open, said particulate solid can be discharge from the inner compartment. The filter element usually comprises a sleeve of filter cloth material which is advantageously supported on a wire mesh screen held around the inner tubular assembly of the tube pressure filter. Such a filter element is described in more detail in British patent specification No. 1,317,887.

Conveniently, the inner tubular assembly of a tube pressure filter of the kind set forth comprises a cylindrical central section, around which central section there is disposed the filter element, and upper and lower end sections secured one to each end of said cylindrical central section, each of which end sections includes a portion (which cooperates with an adjacent portion of the outer tubular assembly to close the chamber of annular cross-section when said tubular assemblies are in their first position) of greater diameter than said cylindrical central section and a fairing mounted on or adjacent to said portion so as to extend around an end of the central section. Each fairing constitutes means whereby a gradual reduction of diameter occurs from said portion of greater diameter than the central section to said central section, i.e. the outwardly facing surface of the fairing slopes inwardly from the rim of said portion of greater diameter than the central section to said central section. The outwardly facing surface of the fairing can be linear or curved, in the latter case with either a concave or convex profile.

SUMMARY OF THE INVENTION

According to the present invention there is provided a tube pressure filter of the kind set forth wherein the inlet of the inner compartment is located in the upper end section of the inner tubular assembly and includes a feed distribution system which comprises a substantially annular aperture extending around the upper end section of the inner tubular assembly and debouching into the inner compartment of said tube pressure filter of the kind set forth, said substantially annular aperture being (a) constructed and disposed so that, in use, feed material debouching therefrom has a downward component of velocity and (b) in communication with an antechamber formed in the upper end section of the inner tubular assembly, into which antechamber a mixture to be pressure filtered can be introduced under pressure through a feed conduit.

Tube pressure filters of the kind set forth and in accordance with the invention are preferably constructed so that some at least of the parts from which the upper and lower end sections of the inner tubular assembly are assembled are identical. Similarly, it is advantageous if the outer tubular assembly includes upper and lower end sections which are assembled from parts which are identical. In this way the total number of different parts, or components, to be provided for a single tube pressure filter can be reduced.

In one embodiment of a tube pressure filter in accordance with the invention the inner compartment of the tube pressure filter is provided with a second inlet located in the lower end section, this second inlet including a feed distribution system similar to that in the upper end section, but with the feed conduit which delivers the mixture to be pressure filtered to the antechamber in the lower end section including or cooperating with a non-return valve so as to prevent the flow back along the feed conduit of the mixture to be pressure filtered when the latter is under high pressure. It may also be advantageous to provide for the feed conduit associated with the feed distribution system in the upper end section of the inner tubular assembly to include or cooperate with a non-return valve.

The substantially annular aperture of the feed distribution system advantageously has a width such that it is not so small that feed material cannot be introduced into the inner compartment quickly enough nor so large that the impermeable elastic sleeve dividing the chamber of annular cross-section into the inner and outer compartments is extruded into the aperture and damaged. It has been found that generally the substantially annular aperture should have a width which is not larger than 3.0 mm nor smaller than 0.50 mm. Preferably the substantially annular aperture has a width not larger than 1.50 mm and most preferably has a width in the range of from 0.50 to 1.25 mm. Advantageously, the substantially annular aperture of the feed distribution system in the upper end section of the inner tubular assembly communicates with its antechamber by way of a substantially toroidal chamber which is disposed at a higher level than said annular aperture, which encircles the ante-chamber, and which is connected thereto by a plurality of discrete ducts. The substantially toroidal chamber distributes the feed material evenly around the annular aperture. The ducts connecting the substantially toroidal chamber with the anti-chamber are preferably, but not essentially, spaced substantially uniformly. The total cross-sectional area of all such ducts is preferably approximately equal to the area of the annular aperture.

In a preferred embodiment of a tube pressure filter of the kind set forth which is in accordance with the present invention, the inner tubular assembly comprises a cylindrical central section, and upper and lower end sections, each of which end sections includes a portion of greater diameter than the cylindrical central section and a fairing mounted on or adjacent to said portion so as to extend around an end of the cylindrical central section. The filter element can be clamped between the fairings and the central cylindrical section or the filter element and each of the fairings are constructed so that (a) each end of the filter element, conveniently in the form of a filter cloth sleeve, is or can be secured to the outwardly facing surface of one of said fairings and (b) the filter element can be fitted and subsequently replaced without removing either of the end sections from the cylindrical central section. In one method of securing the ends of the filter cloth sleeve to the outwardly facing surfaces of the fairings each fairing has an annular groove formed in its outwardly facing surface and an end of the filter cloth sleeve is secured in the groove by binding it with several turns of cord and tying the ends of the cord.

Advantageously, the effective volume available within the inner tubular assembly of a tube pressure filter in accordance with the invention is less than the volume contained between the inner and outer tubular assemblies. If necessary to achieve this aim, a second cylindrical member (whose interior is isolated from the space defined between said second cylindrical member and the inside wall of the inner tubular assembly) is supported within the inner tubular assembly so as to reduce the effective volume within the inner tubular assembly.

For a better understanding of the invention, and to show more clearly how the same may be carried into effect, reference will now be made, by way of example, to the accompanying drawings in which.

Figure 1:
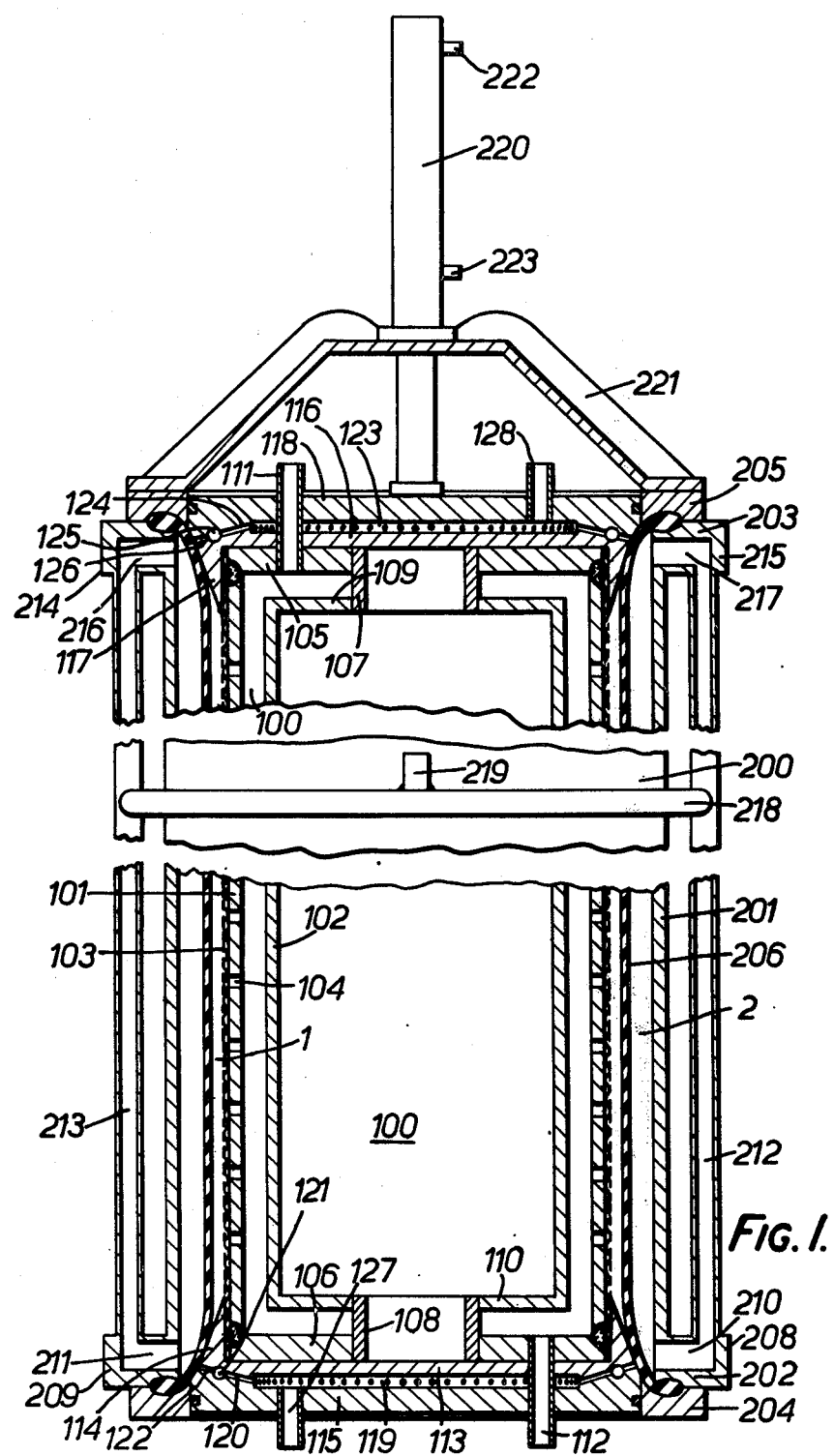
FIG. 1 shows in broken longitudinal section one embodiment of a tube pressure filter in accordance with the invention.

Referring first to FIG. 1, a tube pressure filter essentially comprises an inner, generally tubular assembly 100 and an outer, generally tubular assembly 200, which are supported in a generally upright position.

The inner tubular assembly includes two substantially concentric cylindrical members 101 and 102. The cylindrical member 101 constitutes the cylindrical central section of the inner tubular assembly and acts as a support for a filter element 103; and it is provided with a plurality of apertures 104 which allow filtrate (which has passed through the filter element) to enter the interior of cylindrical member 101. The filter element 103 conveniently comprises a cylinder of wire mesh which fits closely over the tube 101, and a filter cloth sleeve which fits tightly over the wire mesh cylinder, but, if desired, a coarse-weave backing cloth may be used between the wire mesh cylinder and the filter cloth sleeve.

To the upper and lower ends of the central cylindrical section of the inner tubular assembly there are attached upper and lower end sections of the inner tubular assembly. These end sections are formed by closing the upper and lower ends of the cylindrical member 101 by circular plates 105 and 106, respectively, each of which plates is provided with a central hole which accommodates an end of one of two cylindrical collars 107 and 108, the other end of each of the collars fitting into central holes provided in circular end plates 109 and 110 which close the ends of the cylindrical member 102. An upper inlet pipe 111, for compressed air, and a lower outlet pipe 112, for filtrate, pass respectively through end plates 105 and 106 and communicate with the space between cylindrical members 101 and 102. The cylindrical member 102 is sealed and is provided so as to decrease the internal volume of member 101 which must be filled with compressed air before the pressure therein rises sufficiently to detach filter cake from the outer surface of the filter element 103. Attached to plate 106 by means of a plurality of stud bolts (not shown) is an inner member 113 which incorporates a fairing 114, and an outer member 115. Similarly there is attached to plate 105 an inner member 116 which incorporates a fairing 117, and an outer member 118. Inner member 113 and outer member 115 define between them a chamber 119, a plurality of radially-extending ducts 120 of circular cross section, a toroidal chamber 121 and an annular aperture 122. At the upper end of the tube pressure filter inner member 116 and outer member 118 define between them a central ante-chamber 123, a plurality of radially-extending ducts 124, a toroidal chamber 125 and an annular aperture 126. An inlet tube 127 communicates with chamber 119 and an inlet tube 128 communicates with ante-chamber 123.

The outer tubular assembly 200 comprises a cylindrical central portion 201, a lower flange portion 202 and an upper flange portion 203 both which are welded to the central portion, and a lower annular member 204 and an upper annular member 205 which are attached to the flange portions 202 and 203 respectively by stud bolts (not shown). Flange portion 202 and annular member 204 have cut into them specially shaped grooves so that they can accommodate and clamp between them the lower annular beading of an impermeable elastic sleeve 206. Similarly the upper annular beading of the elastic sleeve 206 is clamped between flange portion 203 and annular member 205. Flange portion 202 is provided with two diametrically opposed protruberances 208 and 209 in each of which is formed a bore, 210 and 211 respectively, which extends radially outwards from the inner wall of the flange portion but stops short of the outer edge of the protruberance. Conduits 212 and 213 respectively are attached to the protruberances and communicate with the bores 210 and 211. Similarly flange portion 203 is provided with protruberances 214 and 215 to which are attached the conduits 212 and 213 which communicate with radial bores 216 and 217. Approximately midway between the two flange portions 202 and 203 a substantially semi-circular manifoled 218 connects together the conduits 212 and 213 and is provided with an inlet/outlet 219 which may be connected to a vacuum pump or to a pump supplying hydraulic fluid at low pressure or to a pump supplying hydraulic fluid at high pressure. The inner orifices of bores 210, 211, 216 and 217 (which discharge into the outer compartment 2) are covered by wire mesh to prevent damage to the elastic sleeve 206.

The inner tubular assembly 100 may be displaced vertically downwards relative to the outer tubular assembly 200 by means of a hydraulic ram 220 which is mounted on a spider construction 221 the feet of which are bolted to the upper annular member 205. The hydraulic ram 220 is provided with an inlet/outlet port 222 and an inlet/outlet portion 223 for hydraulic fluid at high pressure so that the inner tubular body may be raised or lowered by connecting the appropriate inlet/outlet to the high pressure pump. When in the closed position (as shown in FIG. 1) a seal is formed between the inner and outer tubular assemblies at the lower end by an O-ring seal, accommodated in a groove in the outer member 115 of the lower end section, and at the upper end by an O-ring seal, accommodated in a groove in the outer member 118 of the upper end section.

The inner and outer tubular assemblies together define an annular chamber which is divided into non-intercommunicating inner and outer compartments 1 and 2 by means of the elastic sleeve 206.

Figure 2:
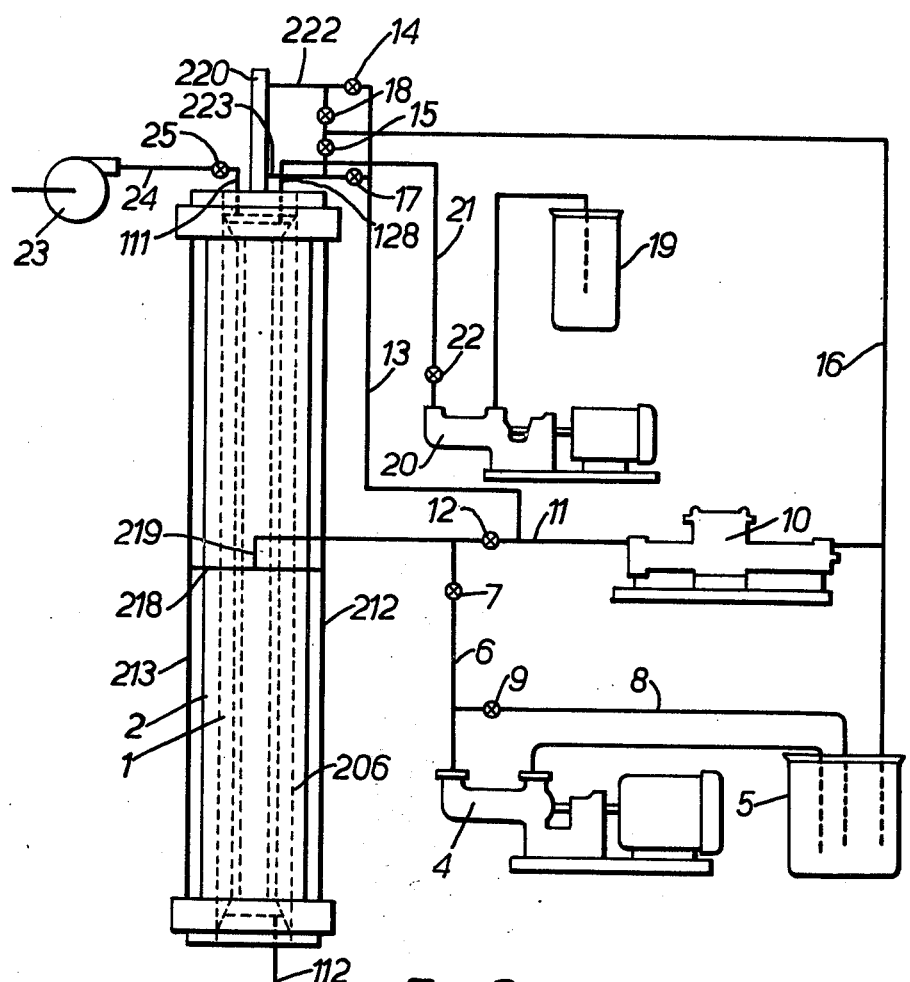
FIG. 2 shows diagrammatically apparatus for separating a liquid and a particulate solid, the apparatus including the tube pressure filter shown in FIG. 1.

Referring now to FIG. 2, there is shown an apparatus which comprises the tube pressure filter described above with reference to FIG. 1 and a number of pumps and valves for the operation of the tube pressure filter. Feed suspension, comprising a mixture of a liquid and a particulate solid to be separated, is drawn from a reservoir 19 by a pump 20 and is delivered through a conduit 21, which is provided with a valve 22, to the feed inlet 128 of the tube pressure filter and from there via antechamber 123, ducts 124, toroidal chamber 125, and annular chamber 126 to the inner compartment. A reversible low pressure pump 4 draws hydraulic fluid from a reservoir 5 and delivers it through a conduit 6, in which is provided a valve 7, to the substantially semi-circular manifold 218 and thence via the vertical conduits 212 and 213 to the outer compartment 2. A by-pass conduit 8, including a valve 9, enables the low pressure pump 4 to continue working when the valve 7 is closed. Hydraulic fluid may also be drawn from the reservoir 5 and supplied to the outer compartment 2 of the tube pressure filter by a high-pressure pump 10 through a conduit 11 in which is provided a valve 12. During the period in which the filter cake is formed and dewatered, filtrate passes through aperture 104 into the interior of the inner tubular assembly, between cylindrical members 101 and 102, and is discharged through the outlet pipe 112.

Hydraulic fluid at high pressure may also be supplied to the inlet/outlet ports 222 and 223 of the hydraulic ram 220 through a conduit 13 and a system of valves. In order to open the inner compartment, by moving the inner tubular assembly, a valve 14 is opened to connect conduit 13 to inlet/outlet port 222. At the same time valve 15 is opened to connect inlet/outlet port 223 to a conduit 16 which discharges into the reservoir 5. In order to close the inner compartment, by moving the inner tubular assembly upwards, relative to the outer tubular assembly, valves 14 and 15 are closed, a valve 17 is opened to connect conduit 13 to inlet/outlet port 223 and at the same time a valve 18 is opened to connect inlet/outlet port 222 to conduit 16.

An air compressor 23 suplies compressed air through a conduit 24, which is provided with a valve 25, to the inlet pipe 111 in order to detach the filter cake from the outer surface of the filter element when the tubular assemblies of the pressure filter are in their second position.

When the tube pressure filter is used, for example, to dewater a suspension of a kaolin clay, the cycle of operations is commenced with the inner and outer tubular assemblies in the closed position shown in FIG. 1, with the vacuum pump 4 connected to the inlet/outlet 219 to keep the elastic sleeve 206 drawn back against the inner wall of the central cylindrical portion 201 of the outer tubular assembly 200, and with the inner compartment 1 formed between the elastic sleeve 206 and the filter element 103 empty. The inlet/outlet 219 is then supplied via pump 4 with hydraulic fluid at a low pressure of about 30 psig. This low pressure hydraulic fliud is fed to the outer compartment 2 between the elastic sleeve 206 and the inner wall of the central cylindrical section 201 of the outer tubular assembly to cause the elastic sleeve to expand towards the filter element 103. At about the same time, or a few seconds later, a feed suspension of kaolin clay is introduced by means of pump 20 into the inner compartment 1, also at a pressure of about 30 psig. The feed suspension can be introduced into the inner compartment 1 under gravity, but the hydraulic fluid is preferably introduced into the outer compartment at approximately the same pressure as that at which the feed suspension enters the inner compartment. The feed suspension is introduced through inlet 128 or through inlets 127 and 128 simultaneously. It is usually most convenient to use inlet 128 only, since the hydrostatic head of feed suspension at this inlet need only be relatively small and the risks of leaks is reduced. In this case inlet 127 should be plugged or connected so that it may be used for the introduction of air into the inner compartment to displace water from the filter cake after it has been formed much in the manner described in British Patent Application No. 3647/76.

Even as the inner compartment 1 is being filled with feed suspension, filtrate is expressed through the filter element 103 and passed through the apertures 104 to the bottom of the cylindrical member 101 from whence it drains through the outlet 112. After the inner compartment has been charged with the desired quantity of feed suspension and when the flow of filtrate has begun to slow down the inlet/outlet port 219 is connected to a pump 10 which supplies hydraulic fluid under high pressure, generally at a pressure in the range from 700 psig to 2000 psig. This pressure is maintained in the outer compartment 2 to squeeze water out of the cake formed on the filter element 103 until the flow of filtrate has almost stopped. The inlet/outlet port 219 is then connected to the vacuum pump 4 to remove the hydraulic fluid from the outer compartment. The inlet/outlet port 222 of the hydraulic ram is the connected to the high pressure pump in order to displace the inner tubular assembly downwards with respect to the outer tubular assembly. The filter cake may fall from the filter element 103 at this point under its own weight or, if necessary, one or more blasts of compressed air can be introduced through the inlet 111 to detach the cake from the filter element 103. The inner tubular assembly is then returned to the closed position by supplying hydraulic fluid at high pressure to the inlet/outlet port 223 of the hydraulic ram and the apparatus is then ready to begin a new cycle.

The hydraulic fluid used may conveniently consist of water containing a small amount of an oil/water emulsion for lubrication purposes.

Figure 3:
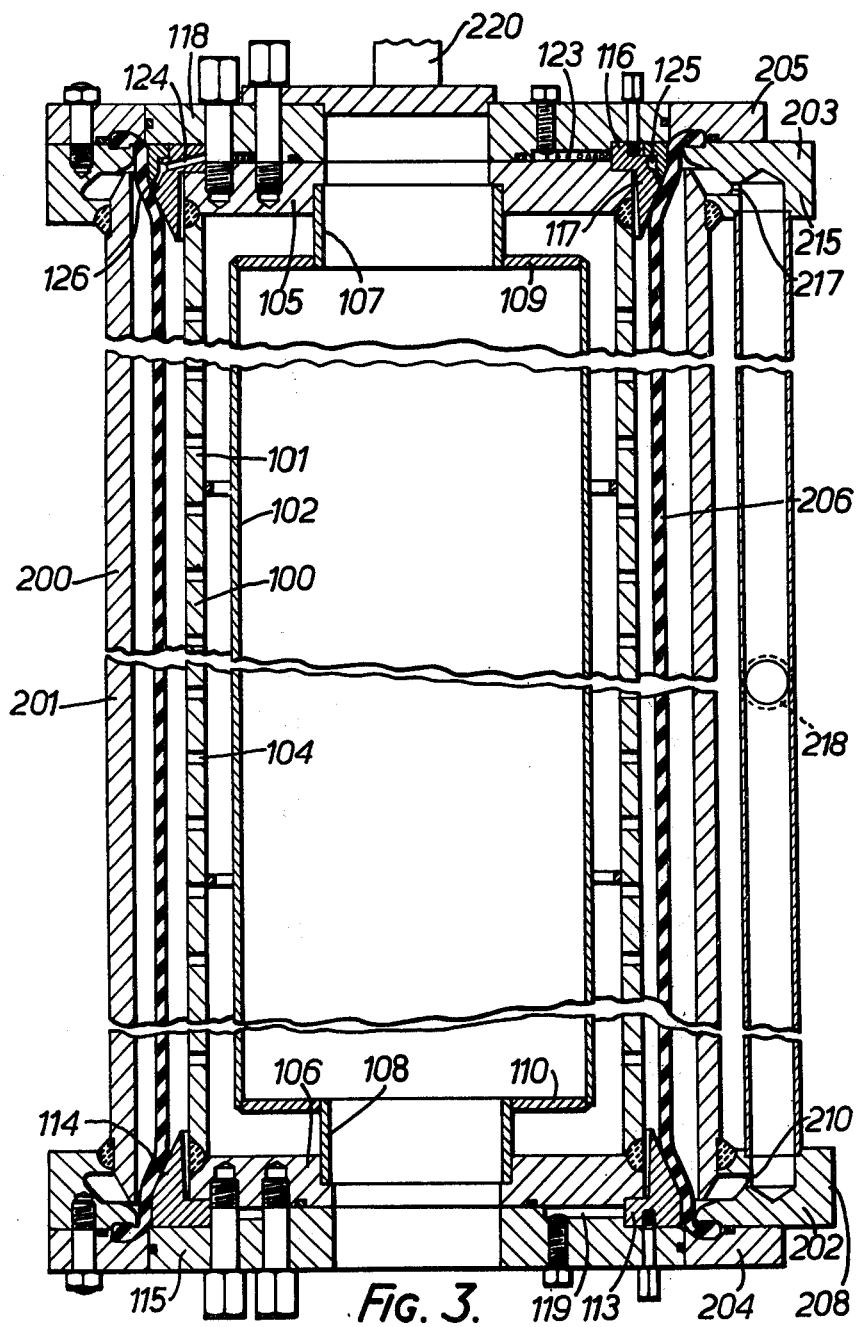
FIG. 3 shows, in broken longitudinal section taken on line X—X of FIG. 5, a second embodiment of a tube pressure filter in accordance with the invention.
Figure 4:
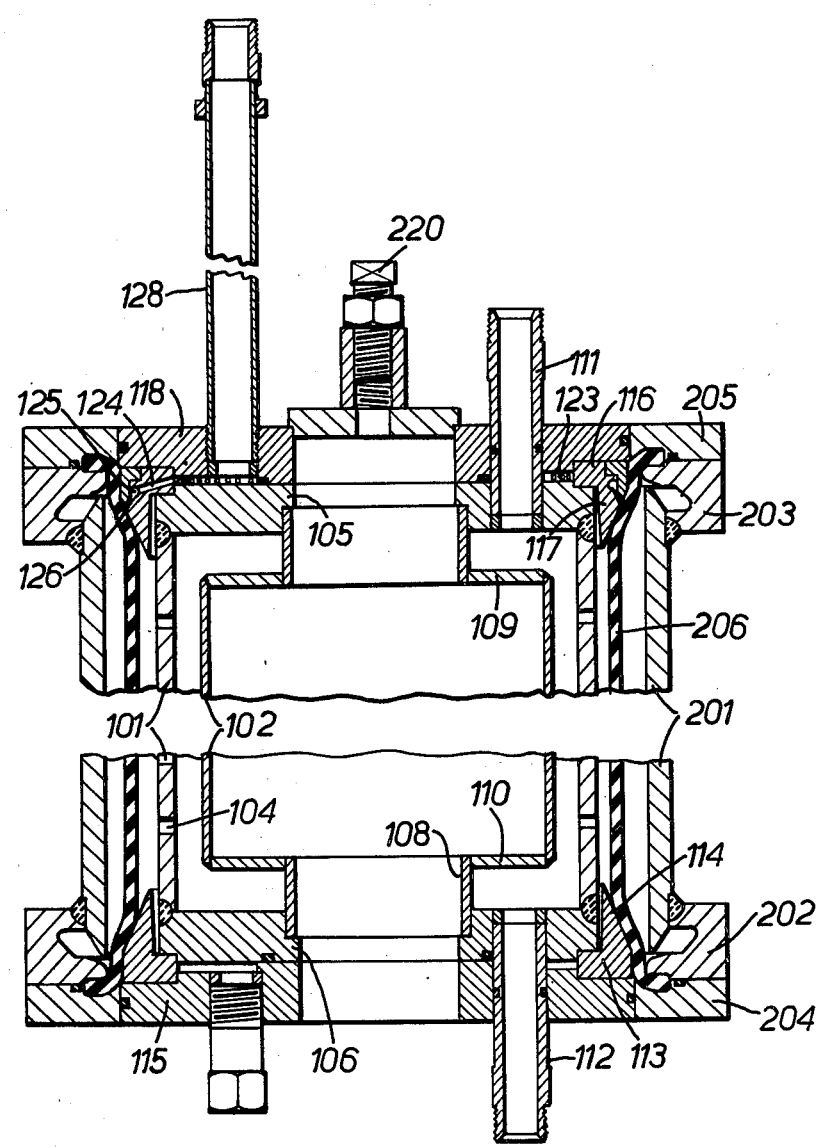
FIG. 4 shows, in broken longitudinal section taken on the line Y—Y of FIG. 5, another view of the second embodiment of a tube pressure filter in accordance with the invention.
Figure 5:
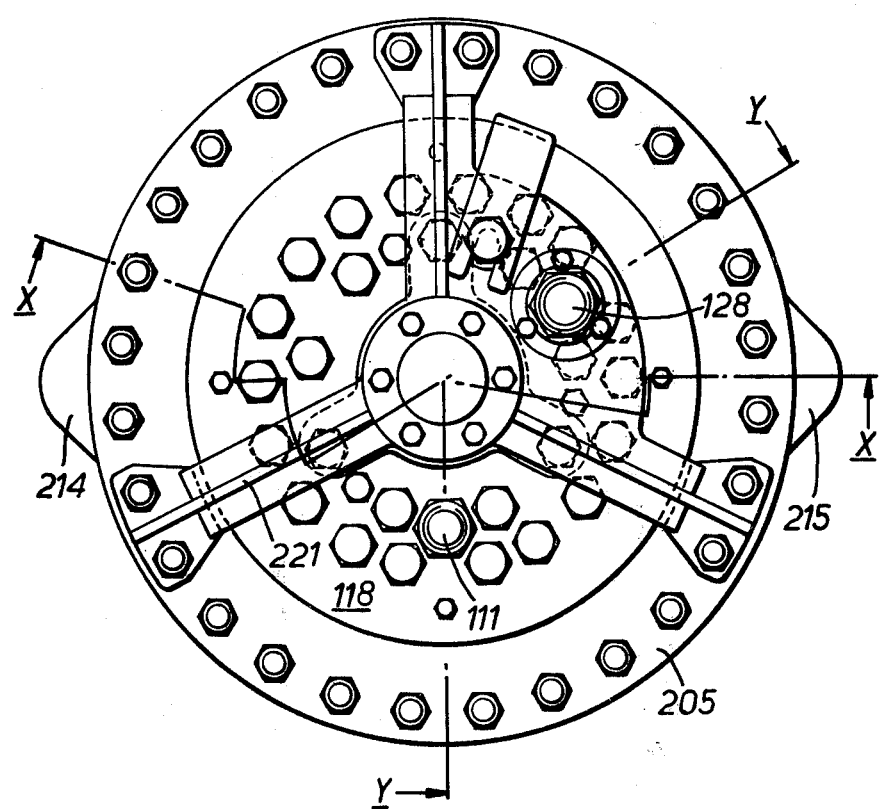
FIG. 5 is a plan view of the second embodiment of a tube pressure filter in accordance with the invention.

Referring now to FIGS. 3 to 5, there is shown a second embodiment of a tube pressure filter according to the invention. The significant differences between this embodiment and that described above with reference to FIGS. 1 and 2 are as follows: The inner member 113 and the outer member 115 fo not define between them ducts or a toroidal chamber or an annular aperture. Inner member 113 and inner member 116 are shaped so that chambers 119 and 123 are defined by the circular plates 105, 106, outer members 115, 118 and inner members 113, 116. The interior of the inner cylindrical member 102 communicates with the outside of the tube pressure filter through the circular plate 106 and outer member 115 of the same diameter as the inside of the collar 108. The corresponding opening at the top is closed by a plate upon which the hydraulic ram 220 acts. The inner orifices of bores 210, 211, 216 and 217 are not covered by a wire mesh but instead terminate in narrow annular slots. In other respects, this embodiment is constructed in substantially the same manner as the embodiment described above with reference to FIGS. 1 and 2.

I claim:

1. In a tube pressure filter which comprises a pair of coaxial, generally tubular inner and outer assemblies arranged one within the other and adapted to be supported in a generally upright position, an impermeable elastic sleeve disposed within and secured to the outer tubular assembly, a filter element disposed around and supported by the inner tubular assembly, outlet means for the discharge from the interior of the inner tubular assembly of filtrate (i.e. liquid) which has passed through the filter element and through apertures in the inner tubular assembly, and means for displacing the tubular assemblies axially relative to one another between first and second positions, the arrangement being such that in the first position of said tubular assemblies they co-operate with each other to define a closed chamber of annular cross-section which is divided into coaxial and non-intercommunicating inner and outer compartmenets by said impermeable elastic sleeve, the inner compartment having an inlet for a feed material comprising a mixture of a liquid and a particulate solid to be separated and the outer compartment having an inlet for a hydraulic fluid under pressure, and in the second position of said tubular assemblies said chamber of annular cross-section is open to enable the particulate solid to be discharged from the inner compartment, the improvement which comprises providing the inlet of the inner compartment in an upper end section of the inner tubular assembly, said inlet including a feed distribution system which comprises a substantially annular aperture extending around the upper end section of the inner tubular assembly and debouching into the inner compartment of said tube pressure filter, said substantially annular aperture being (a) constructed and disposed so that, in use, feed material debouching therefrom has a downward component of velocity and (b) in communication with an antechamber formed in the upper end section of the inner tubular assembly, into which antechamber a mixture to be pressure filtered can be introduced under pressure through a feed conduit.

2. A tube pressure filter as claimed in claim 1, wherein said inner tubular assembly comprises an upper end section, a cylindrical central section and a lower end section, wherein said upper and lower end sections each include a portion of greater diameter than said cylindrical section and a fairing mounted on or adjacent to said portion so as to extend around an end of said cylindrical central section, and wherein one or more of the parts from which the upper end section is formed is identical to a corresponding part in the lower end section of the inner tubular assembly.

3. A tube pressure filter as claimed in claim 1, wherein the substantially annular aperture of the feed distribution system advantageously has a width such that it is not so small that feed material cannot be introduced into the inner compartment quickly enough nor so large that the impermeable elastic sleeve dividing the chamber of annular cross-section into the inner and outer compartments is extruded into the substantially annular aperture and damaged.

4. A tube pressure filter as claimed in claim 3, wherein the substantially annular aperture has a width which is not larger than 3.0 mm nor smaller than 0.50 mm.

5. A tube pressure filter as claimed in claim 1, wherein the substantially annular aperture of the feed distribution system in the upper end section of the inner tubular assembly communicates with the ante-chamber by way of a subtantially toroidal chamber which is disposed at a higher level than said annular aperture, which encircles the ante-chamber, and which is connected thereto by a plurality of discrete ducts.

6. A tube pressure filter as claimed in claim 1, wherein the effective volume available within the inner tubular assembly of the tube pressure filter is less than the volume contained between the inner and outer tubular assemblies.

7. A tube pressure filter as claimed in claim 6, wherein there is supported within the inner tubular assembly a second cylindrical member (whose interior is isolated from the space defined between said second cylindrical member and the inside wall of the inner tubular assembly) so as to reduce the effective volume available within the inner tubular assembly.

* * * * *